No. 881,349. PATENTED MAR. 10, 1908.
A. A. SHINGLETON.
AUTOMATIC TIME VALVE.
APPLICATION FILED FEB. 19, 1906.

6 SHEETS—SHEET 1.

WITNESSES:
Clarence L. Perdew
Harry Henke

INVENTOR,
Arch A. Shingleton
By James N. Ramsey
ATTORNEY.

THE NORRIS PETERS CO., WASHINGTON, D. C.

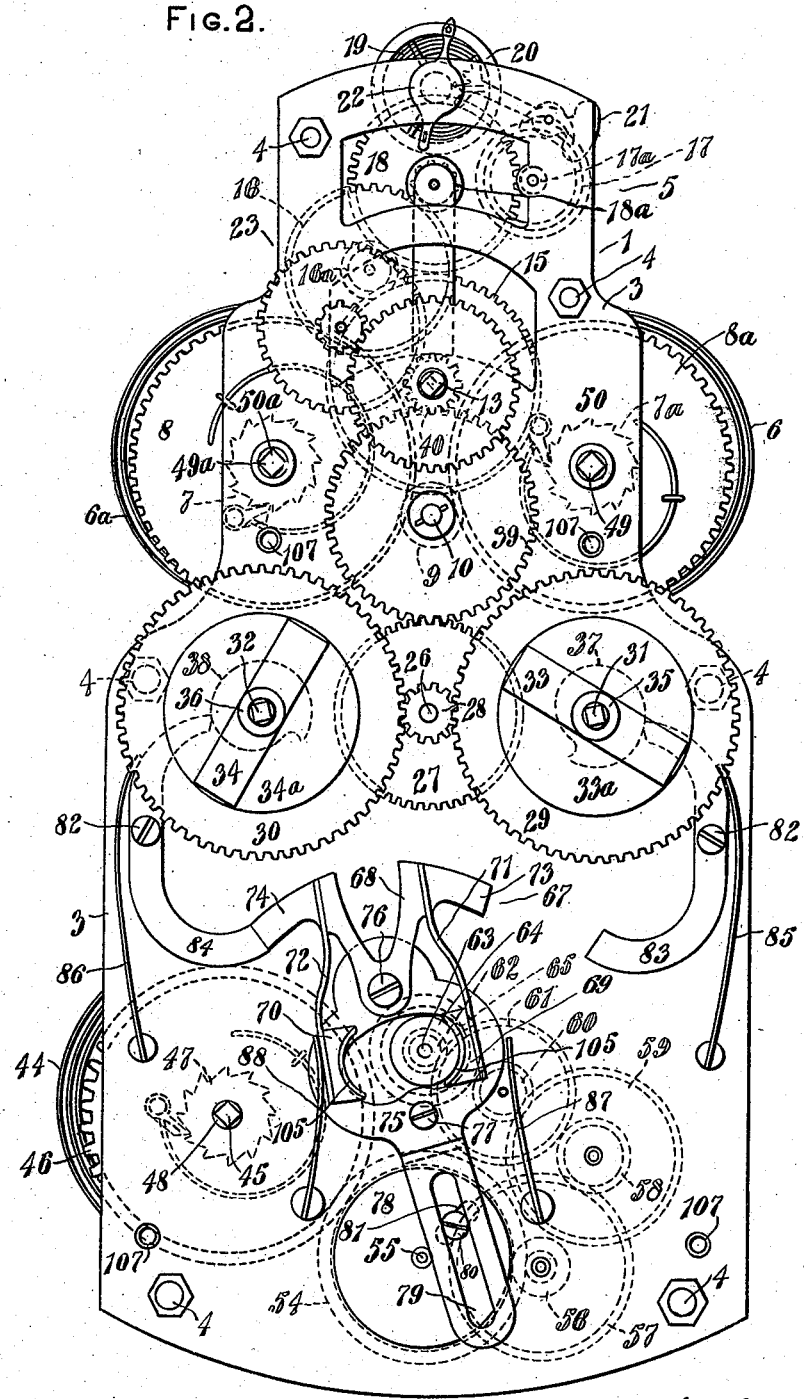

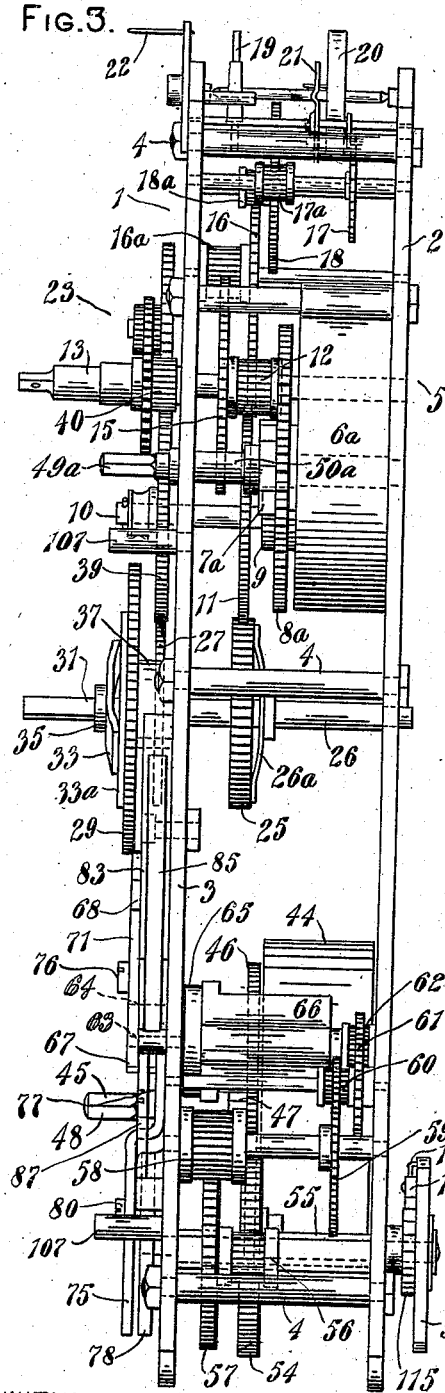
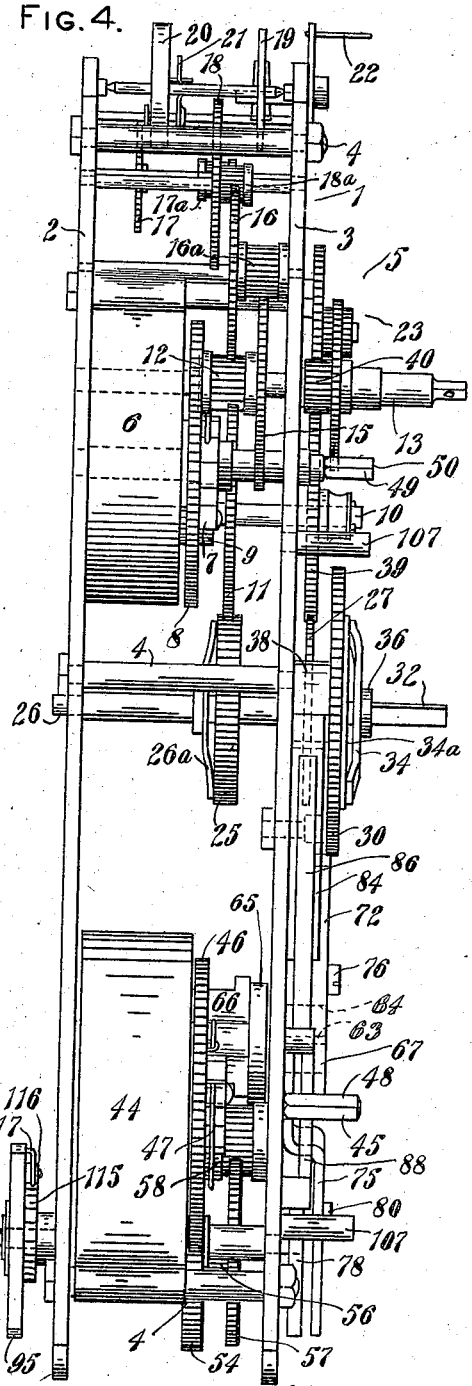

No. 881,349. PATENTED MAR. 10, 1908.
A. A. SHINGLETON.
AUTOMATIC TIME VALVE.
APPLICATION FILED FEB. 19, 1906.
6 SHEETS—SHEET 4.
Fig. 5.
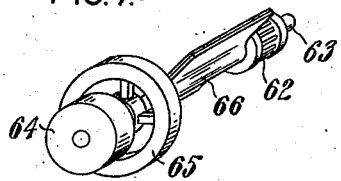
Fig. 7.
Fig. 9.
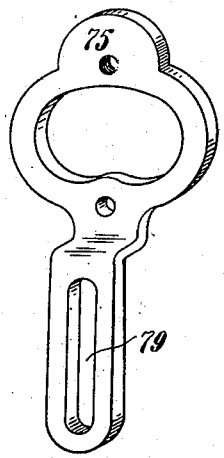
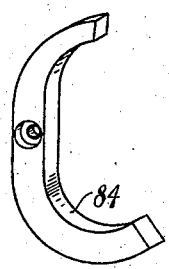
Fig. 6.
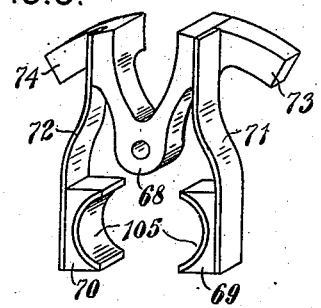
Fig. 8.
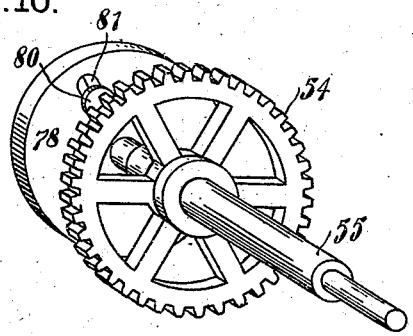
Fig. 10.
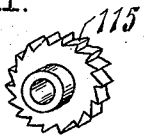
Fig. 11.
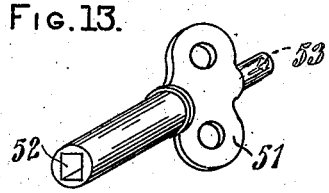
Fig. 13.
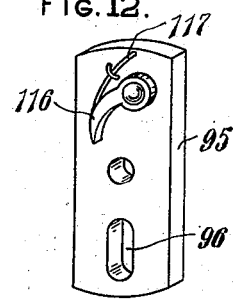
Fig. 12.
WITNESSES:
Clarence L. Perdew
Harry Henke
INVENTOR
Arch A. Shingleton
BY James N. Ramsey
ATTORNEY.

No. 881,349. PATENTED MAR. 10, 1908.
A. A. SHINGLETON.
AUTOMATIC TIME VALVE.
APPLICATION FILED FEB. 19, 1906.

6 SHEETS—SHEET 5.

WITNESSES
Clarence L. Perdue
Harry Henke

INVENTOR
Arch A. Shingleton
BY James N. Ramsey
ATTORNEY.

No. 881,349. PATENTED MAR. 10, 1908.
A. A. SHINGLETON.
AUTOMATIC TIME VALVE.
APPLICATION FILED FEB. 19, 1906.
6 SHEETS—SHEET 6.
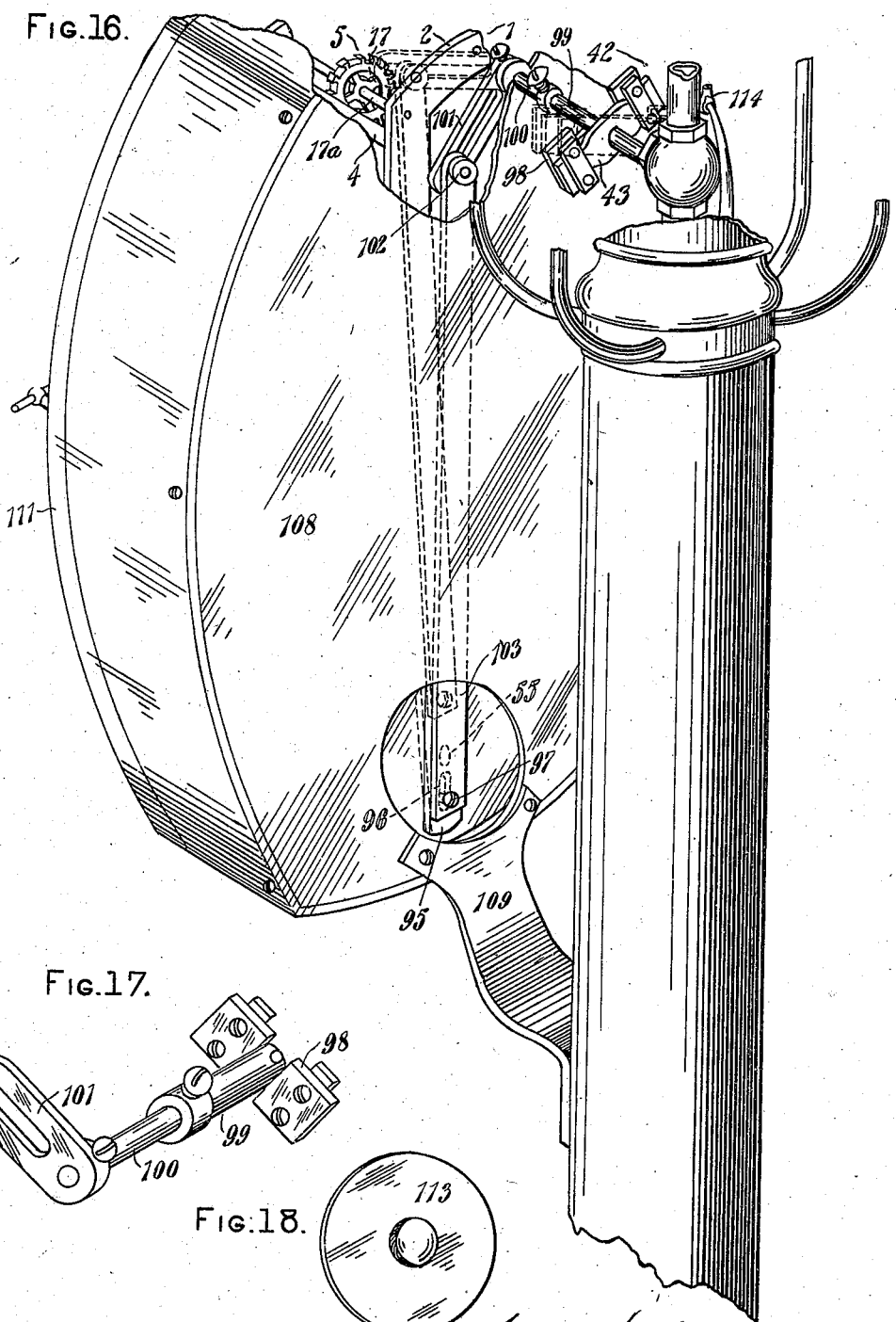
Fig. 16.
Fig. 17.
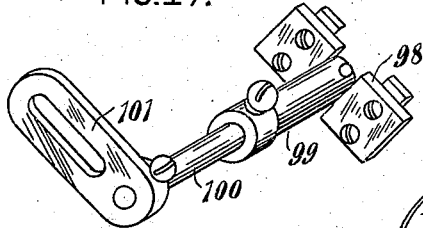
Fig. 18.
WITNESSES
Clarence L. Perdew
Harry Henke
INVENTOR,
Arch A. Shingleton
BY James F. Ramsey
ATTORNEY.
THE NORRIS PETERS CO., WASHINGTON, D. C.

UNITED STATES PATENT OFFICE.

ARCH A. SHINGLETON, OF CINCINNATI, OHIO.

AUTOMATIC TIME-VALVE.

No. 881,349.  Specification of Letters Patent.  Patented March 10, 1908.

Application filed February 19, 1906. Serial No. 301,893.

*To all whom it may concern:*

Be it known that I, ARCH A. SHINGLETON, a citizen of the United States, residing at Cincinnati, in the county of Hamilton and State of Ohio, have invented certain new and useful Improvements in Automatic Time-Valves, of which the following is a specification.

My invention relates to clock controlled mechanisms the object being to alternately open and close a valve automatically at predetermined times.

My invention consists of a crank in operative connection with the valve to be opened and closed, adapted, by suitable connection with a motor, to be rotated to operate said valve, a sheave also rotated by, and, by reaction, controlling the action of said motor, a brake adapted to engage said sheave, and a support for said brake operatively connected to said crank whereby said brake is automatically brought into engagement with said sheave when said valve has been opened or closed by said crank.

My invention also consists of the parts and of the details of construction and arrangement of said parts as will hereinafter be more fully described and claimed.

Figure 1:
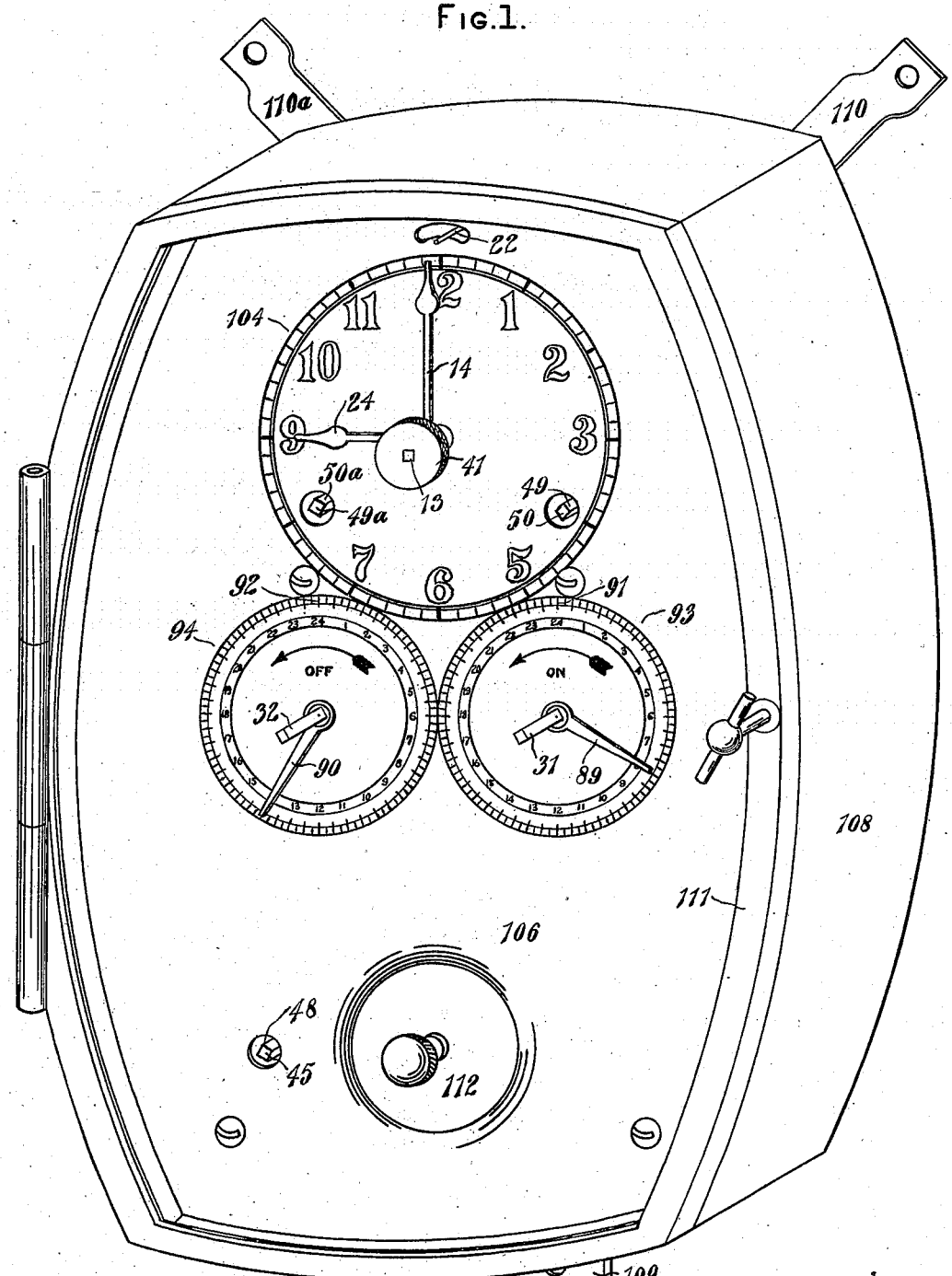
Figure 14:
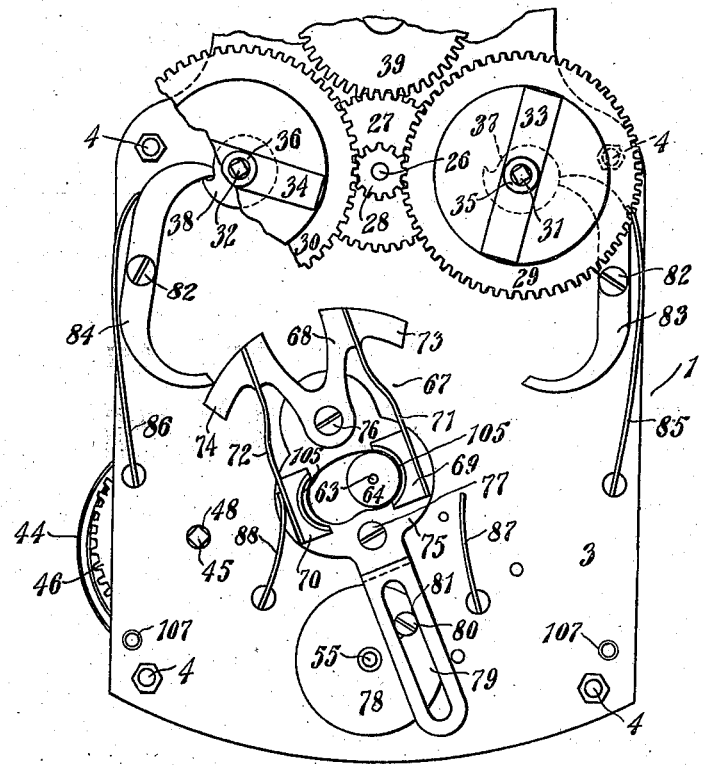
Figure 15:
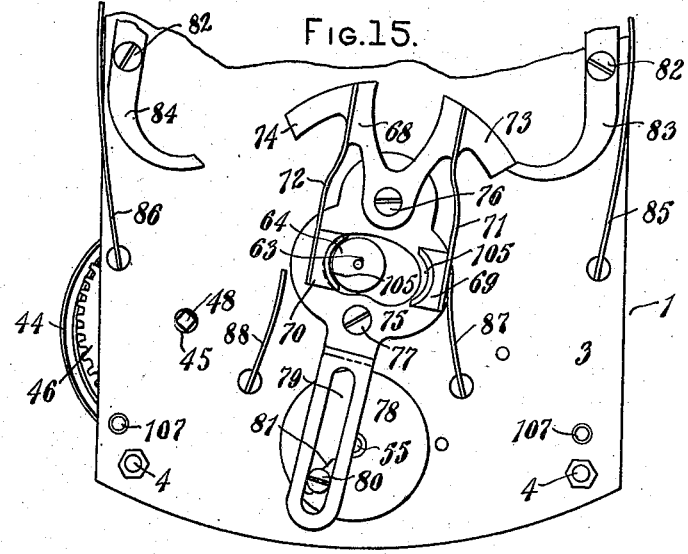

In the drawings: Figure 1 is a perspective view of my invention from the front showing the arrangement of the dials. Fig. 2 is a front elevaton of my invention with the case, dial plate and hands removed. Fig. 3 is a right elevation of the same. Fig. 4 is a left elevation of the same. Fig. 5 is a perspective view of one of the cams. Fig. 6 is a perspective view of one of the cam levers. Fig. 7 is a perspective view of the sheave shaft having the sheave, balance wheel, fan and pinion mounted thereon. Fig. 8 is a perspective view of the brake. Fig. 9 is a perspective view of the brake support. Fig. 10 is a perspective view of the crank shaft having the face plate and the gear mounted thereon. Fig. 11 is a perspective view of the ratchet wheel. Fig. 12 is a perspective view of the crank. Fig. 13 is a perspective view of the key. Fig. 14 illustrates my invention beginning to act. Fig. 15 illustrates my invention ceasing to act. Fig. 16 is a perspective view from the rear showing how my invention is applied, the dotted lines representing the positions of the various parts when the valve is opened, while the solid lines represent their positions when the valve is closed. Fig. 17 is a perspective view of the stem and attachments. Fig. 18 is a perspective view of the removable plate.

Preferably my invention is constructed as follows: A frame, 1, comprising the rear plate 2, front plate 3 and posts 4, forms a support and bearings for an ordinary clock mechanism 5 preferably having two main springs 6 and $6^a$ with their attendant winding mechanisms 7 and $7^a$, and primary gears 8 and $8^a$. Both primary gears, 8 and $8^a$, mesh with the pinion 9 rigid on the shaft 10, as is also the second wheel 11 which meshes with the pinion 12, frictionally mounted upon the shaft 13 which also carries the minute hand 14. A third wheel 15 is rigidly attached to the pinion 12 and likewise a fourth wheel 16 is attached to a pinion $16^a$, in mesh with the third wheel 15, and revolves the escapement wheel 17 by means of the fifth wheel 18, the pinion $18^a$ and the pinion $17^a$ on the escapement wheel shaft. The escapement wheel is controlled by the usual hair-spring 19 and balance wheel 20 by means of the escapement lever 21, and a regulator 22 is provided upon the front plate 3. Also the usual train of gears 23 is provided for revolving the hour hand 24.

The above description of the clock mechanism is given only for the purpose of facilitating the succeeding references to the parts thereof and I do not wish to be understood as claiming said clock, in itself, as my invention, any of the usual clock mechanisms being adapted for use in combination with my invention, which use is accomplished by means of the intermediate gear 25 in mesh with the second wheel 11. This intermediate gear 25 is frictionally mounted upon the intermediate shaft 26 by means of the flat spring $26^a$. Rigidly mounted upon the shaft 26 in front of the plate 3 is the gear 27 and pinion 28. This pinion 28 is in mesh, on either side, with the right and left cam gears 29 and 30, respectively, held frictionally upon the cam shafts 31 and 32, respectively, by means of the flat springs 33 and 34, respectively, and the nuts 35 and 36, respectively. The cams 37 and 38 are rigidly mounted upon the cam shafts 31 and 32, respectively. The gear 27 is provided upon the shaft 26, as above described, to mesh with the idler 39 in mesh with the pinion 40 rigidly mounted upon the shaft 13, for the purpose of causing the cam gears 29 and 30 to revolve when the shaft 13 is manually revolved in setting the clock, as, owing to the pinion 12 being only frictionally mounted upon the shaft 13, without the above positive connection between the shaft 13 and cam gears 29 and 30, the relative positions of the cams 37 and 38 and the hands 14 and 24 would not be maintained under all contingencies. For the purpose of conveniently manually revolving the shaft 12, to set the clock, I prefer to provide a thumb knob 41 on the forward end thereof. The two mainsprings 6 and 6ª are provided to give the clock ample power for rotating the cam gears 29 and 30.

For opening and closing the valve, which is represented at 42, in Fig. 16 in this case a gate valve with a handle 43, I prefer to use a main spring 44 mounted on the shaft 45 with the primary gear 46 having a winding mechanism 47. The shaft 45 has its forward end square as at 48 and preferably of the same size and shape as the forward ends 49 and 49ª of the shafts 50 and 50ª of the two clock mainsprings 6 and 6ª respectively, and a key 51 is provided with a square socket 52 to fit upon the square ends 48, 49 and 49ª, for the purpose of winding up the springs 44, 6 and 6ª, respectively, when necessary. Preferably the cam shafts 31 and 32 are squared, and the key 50 is provided at its other end with a square socket 53 to fit the cam shafts 31 and 32, for the purpose of setting them in the desired position, as will be described. It is possible to thus turn the cam shafts 31 and 32 without turning the cam gears 29 and 30 since the gears are only held frictionally thereon by means of the flat springs 33 and 34 which will merely slide around the surfaces 33ª and 34ª of the cam gears 29 and 30 respectively.

In mesh with the primary gear 46 is the crank shaft gear 54 rigidly mounted upon the crank shaft 55 and this crank shaft gear 54 is also in mesh with the pinion 56 which is rigidly attached to the first gear 57. The first gear 57 meshes with the pinion 58 which is rigidly attached to the second gear 59; the second gear 59 meshes with the pinion 60, and the pinion 60 is rigidly attached to the third gear 61 which, meshing with the pinion 62 on the sheave shaft 63 revolves the sheave 64, rigidly mounted thereon in front of the plate 3.

The sheave shaft 63 is preferably provided, behind the plate 3 with a suitable balance wheel 65 and a fan 66, the fan being provided to retard the motion of the above train of gears and make the sheave 64 more fully controllable by the brake 67, than is the case when the high velocity ratio and attendant friction is depended upon alone. The brake 67 is composed of the yoke 68 to which, at either side, are yieldably attached the brake shoes 69 and 70 by means of the springs 71 and 72 respectively. The yoke 68 also has, at either side, the laterally projecting lugs 73 and 74 and is pivoted to the brake support 75 by the screw 76. The brake support 75 is pivoted to the front plate 3 of the frame by the screw 77 and extends around the sheave shaft 63 above the pivotal screw 77 and over and in front of the face plate 78 rigidly mounted upon the crank shaft 55. The portion of the brake support 75 extending in front of the face plate 78 is provided with the radial slot 79 and a stud 80 is adjustably secured in a radial slot 81 in the face plate 78 so that it extends upward and engages the sides of the slot 79 in the brake support 75. By this arrangement, when the crank shaft 55, and consequently the face plate 78 is revolved, the brake support is reciprocated and carries the brake 67 with it from side to side.

Engaging each of the cams 37 and 38 and pivoted to the front plate 3 by the screws 82 are the cam levers 83 and 84 respectively. The cam levers 83 and 84 extend downward and are adapted to engage the lugs 73 and 74, respectively, on the yoke 68. The springs 85 and 86 are provided to hold the cam levers 83 and 84 in engagement with the cams 37 and 38 respectively, and the springs 87 and 88 are adapted to instantly reciprocate the yoke 68, when one of its lugs 73 or 74 is disengaged by one of the cam levers 83 or 84, respectively. This disengages the brake shoe 69 or 70, as the case may be, from the sheave 64 allowing the train of gears and the crank shaft 55 to be revolved, and thus operate the valve 42.

The pointers 89 and 90 are mounted upon the cam shafts 31 and 32 in such relative position to the cams 37 and 38, respectively, that when the cam levers 83 and 84 are allowed to assume their releasing positions the pointers will point to the starting points 91 and 92 on the dials 93 and 94, respectively. I prefer to graduate the dials 93 and 94 into twenty-four spaces, representing the hours of a day, and to subdivide these spaces into convenient fractions to facilitate setting the cams 37 and 38, and to so proportion the various gears and pinions connecting the cams 37 and 38 with the clock mechanism 5, that the cam gears 29 and 30 will make just one revolution in a day. Thus each of the cam levers 83 and 84 will be operated by the cams 37 and 38 once each day to release the yoke 68 and disengage the brake shoe 69 or 70, as the case may be, from the sheave 64. The graduations around the dials 93 and 94 are numbered from one to twenty-four and the dials are distinguished by suitable words such as "off" and "on".

The crank 95 is mounted upon the crank-shaft 55 behind the rear plate 2 and has the radial slot 96 into which is adjustably secured the stud 97. Upon the handle 43 of the valve 42 is bolted the plate 98 to which is pivotally secured the sleeve 99 receiving the stem 100 which carries the crank 101. The crank 101 is also slotted radially and the adjustable stud 102 is secured therein. To complete the connection the link 103 is pivoted to the studs 97 and 102. The radial slots and adjustable studs are provided to facilitate the adjustment of the stroke of the various parts and thus adapt my invention to the requirements in each particular application.

The upper large dial 104 is, as will be seen, an ordinary clock dial, upon which the time may be noted by means of the minute hand 14 and hour hand 24. To set my improved time valve to open at any desired time, calculate the period of time, in hours, that will elapse until it is desired that it shall open. Then turn the pointer on the dial 93 marked "on" in the direction of the arrow to the subdivision representing that number of hours upon the dial. This turns the cam 37 independently of the cam gear 29 and the clock mechanism 5 to such a point that it will require just the desired number of hours for it to reach the position for operating the cam lever 83 and disengaging it from the lug 73 on the yoke 68. Exactly the same method is used in setting the other pointer 94 to close the valve. Thus suppose it is desired at nine o'clock, before noon, to set my improved automatic time valve to open at five o'clock, after noon. The period of time that will elapse until five o'clock is eight hours, therefore the pointer 89 on the "on" dial 93 is set at "8". Now if it is desired, at the same hour, to set the valve to close at eleven o'clock, afternoon, the "off" pointer 90 will be set at "14" which is the number of hours between nine o'clock, before noon, and eleven o'clock after noon. After the pointers have been set as above the valve will be opened at the same time each day and closed at the same time each day without further attention other than winding the springs 6 and 6ª and 44 to give motive power to the clock and valve operating mechanism, respectively, or the position of the pointers 89 and 90 may be varied from day to day as desired. In any case the valve will be opened or closed when the pointer 89 or 90, respectively, has reached the graduation "24" on its respective dial.

The valve operating mechanism is held in check at all times, except when in action, by the friction between the brake shoe 69 or 70 and the sheave 64 and in order to increase this friction I prefer to face the concave surfaces 105 of the brake shoes 69 and 70 with leather or similar material. The dial plate 106 is supported away from the front plate 3 by means of the posts 107 to which it is secured.

The case 108 supported by means of the braces 109, 110 and 110ª has the hinged front 111 to facilitate winding and setting of the mechanism and a removable plate 112 is provided in order that the stud 80 may be conveniently adjusted. A similar plate 113 is provided in the back of the case to permit the adjustment of the stud 97. The lamp used with my improved automatic time valve is to be provided with a means for lighting the gas when the valve is opened, such as the "pilot" burner 114. In order that the valve may be operated independently of the above described mechanism as well as to give the proper adjustment, I provide the ratchet wheel 115 on the crank shaft 55 and the pawl 116 on the crank 95 held in engagement with the ratchet wheel 115, by the spring 117, and to mount the crank 95 loosely upon the crank shaft 55, as shown.

The pivotal connection between the plate 98 and sleeve 99 as well as the telescopic connection between the sleeve 99 and stem 100, is provided to allow for any inequalities in the surfaces upon which it may be necessary to mount my invention in use. The front 111 of the case is preferably of glass so that the dials may be seen without opening and it is desirable that the whole case be dust proof for the better protection of the mechanism.

While I have described and shown a peculiar construction herein, I do not wish to be understood as limiting myself to it, but what I claim as new and desire to secure by Letters Patent is:

1. In an automatic time valve, the combination of a clock mechanism, a frame in which said clock mechanism is mounted, a crank shaft journaled in said frame, a valve adjacent to said frame, a crank on said crank shaft, operative connection between said valve and said crank, a face plate on said crank shaft, a projection on said face plate, a brake support pivoted adjacent to said face plate having a recess therein adapted to receive said projection on said face plate, a brake mounted upon said brake support, a sheave in operative connection with said crank shaft adapted to be engaged by said brake, and means whereby said brake is engaged with and disengaged from said sheave.

2. In an automatic time valve, the combination of a clock mechanism, a frame in which said clock mechanism is mounted, a crank shaft journaled in said frame, a valve adjacent to said frame, a crank on said crank shaft, operative connection between said valve and said crank shaft, a face plate on said crank shaft, a projection on said face plate, a brake support pivoted adjacent to said face plate having a recess therein adapted to receive said projection on said face plate, a brake mounted upon said brake support, a sheave in operative connection with said crank shaft adapted to be engaged by said brake, a cam shaft in operative connection with said clock mechanism, cams on said cam shaft, and cam levers engaging said cams and adapted to engage with and disengage from said brake whereby said brake is engaged with and disengaged from said sheave.

3. In an automatic time valve, the combination of a clock mechanism, a frame in which said clock mechanism is mounted, a crank shaft journaled in said frame, a valve adjacent to said frame, a crank on said crank shaft, operative connection between said valve and said crank shaft, a face plate on said crank shaft, a projection on said face plate, a brake support pivoted adjacent to said face plate having a recess therein adapted to receive said projection on said face plate, a brake mounted upon said brake support, a sheave in operative connection with said crank shaft adapted to be engaged by said brake, a cam shaft journaled in said frame, a cam on said cam shaft, a cam gear mounted on said cam shaft adapted to be rotated by said clock mechanism and to rotate said cam shaft, a cam lever in engagement with said cam and adapted to engage with and to disengage from said brake whereby said brake is engaged with and disengaged from said sheave.

4. In an automatic time valve, the combination of a clock mechanism, a frame in which said clock mechanism is mounted, a valve adjacent to said frame, a crank shaft journaled in said frame, a ratchet rigidly mounted on said crank shaft, a crank loosely mounted on said crank shaft adjacent said ratchet, a pawl on said crank in engagement with said ratchet, operative connection between said crank and said valve, a motor adapted to turn said crank shaft and a braking mechanism in connection with said motor controlled by said clock mechanism.

5. In an automatic time valve, the combination of a clock mechanism, a frame in which said clock mechanism is mounted, a valve adjacent to said frame, a crank shaft journaled in said frame, a ratchet rigidly mounted on said crank shaft, a crank loosely mounted on said crank shaft adjacent to said ratchet, a pawl on said crank in engagement with said ratchet, operative connection between said crank and said valve, a face plate on said crank shaft, a projection on said face plate, a brake support pivotally mounted adjacent said face plate and having a recess therein adapted to receive said projection whereby it is reciprocated by said face plate, a brake mounted on said brake support, a sheave rotatively mounted in said frame adjacent said brake and means whereby said brake is engaged with and disengaged from said sheave by said clock mechanism.

ARCH A. SHINGLETON

Witnesses:
HARRY HENKE,
JAMES N. RAMSAY.